(12) United States Patent
Lamphere et al.

(10) Patent No.: US 6,562,227 B2
(45) Date of Patent: May 13, 2003

(54) PLUNGE ELECTROMACHINING

(75) Inventors: Michael Scott Lamphere, Hooksett, NH (US); Roger Barrie Etherington, Boxford, MA (US); Bin Wei, Mechanicville, NY (US)

(73) Assignee: General Electric Company, Schenectady, NY (US)

( * ) Notice: Subject to any disclaimer, the term of this patent is extended or adjusted under 35 U.S.C. 154(b) by 93 days.

(21) Appl. No.: 09/919,055

(22) Filed: Jul. 31, 2001

(65) Prior Publication Data

US 2003/0024825 A1 Feb. 6, 2003

(51) Int. Cl.[7] .............................. B23H 3/00; C25D 17/00
(52) U.S. Cl. ........................ 205/686; 204/212; 204/217; 204/224 M; 204/225
(58) Field of Search ................................ 204/241, 212, 204/217, 225, 224 M; 205/640, 663, 686

(56) References Cited

U.S. PATENT DOCUMENTS

| 3,046,206 A | * | 7/1962 | Johnson et al. ........ 204/224 M |
| 3,288,699 A | * | 11/1966 | Trager et al. .......... 204/224 M |
| 4,772,372 A | | 9/1988 | Bruns et al. |
| 5,128,010 A | | 7/1992 | Ye |

* cited by examiner

Primary Examiner—Nam Nguyen
Assistant Examiner—Thomas H. Parsons
(74) Attorney, Agent, or Firm—V. G. Ramaswamy; Francis L. Conte

(57) ABSTRACT

An electromachining apparatus includes a mandrel for supporting a workpiece next to a cutter mounted on an arbor. The workpiece is powered as an anode and the cutter is powered as a cathode, and a coolant is circulated therebetween. The cutter is rotated and plunge twisted into the workpiece to form a twisted slot therein, with adjacent ones of such slots forming twisted blanks therebetween. The individual blanks may then be subsequently machined to final shape such as an airfoil configuration.

30 Claims, 3 Drawing Sheets

PLUNGE ELECTROMACHINING

BACKGROUND OF THE INVENTION

The present invention relates generally to machining, and, more specifically, to electrical erosion machining.

Gas turbine engines include various rotor blades and stator vanes having specifically configured three-dimensional (3D) airfoils for compressing air and extracting energy from hot combustion gases. Each airfoil has a generally concave pressure side and an opposite generally convex suction side extending axially between leading and trailing edges from root to tip of the airfoil along its radial span.

Each airfoil has axial curvature represented by its camber line, and may twist from root to tip as required for maximizing aerodynamic performance. Fan blades are relatively large and typically have the greatest amount of twist from root to tip in the gas turbine engine.

Each airfoil stage in a gas turbine engine includes a multitude of airfoils extending radially outwardly from a supporting rotor disk. Each airfoil may be individually manufactured and includes a dovetail at its root end sized to engage a complementary dovetail slot formed in the perimeter of the rotor disk. In another configuration, the airfoils are directly formed integrally with the rotor disk in a one-piece or unitary assembly commonly referred to as a blisk.

The rotor blisks have various advantages but require special manufacturing thereof. A solid workpiece disk blank is initially machined to form a row of rough airfoils, which are then finally machined to the precise final dimensions required for intended performance.

Since the complete row of blisk airfoils is made from an initially solid workpiece blank, a substantial amount of material removal is required to achieve the desired final-dimension airfoils thereon. Accordingly, rough and finish machine equipment are required for manufacturing blisks, with attendant overhead and manufacturing costs associated therewith. And, the substantial amount of material removal from the disk blank requires a corresponding amount of machining time and subjects the machining equipment to corresponding wear.

Airfoil blisks are typically manufactured using conventional multiaxis numerically controlled milling machines or electrochemical machines. In a milling machine, a rotating cutter is used for cutting away metal in stages to first roughly form the individual airfoils followed in turn by finish machining thereof. Typically, finish smoothing of the airfoil surfaces by hand grinding or smoothing processes is also required.

In electrochemical machining, a pair of cathode electrodes having the desired final surface shape of the two sides of the individual airfoils are used to electrochemically erode metal from the airfoil blanks which are powered as anodes, with a suitable electrolyte being channeled therebetween for effecting electrochemical erosion. The advantage of electrochemical machining is the ability to form the final airfoil surface finish with little, if any, post-processing thereof.

However, both milling and electrochemical machining require varying amounts of time to complete an individual blisk with its full complement of individual, 3D airfoils thereon.

Accordingly, it is desired to provide a new method and apparatus for machining a complex workpiece, such as a blisk, with a greater rate of material removal therefrom.

BRIEF SUMMARY OF THE INVENTION

An electromachining apparatus includes a mandrel for supporting a workpiece next to a cutter mounted on an arbor. The workpiece is powered as an anode and the cutter is powered as a cathode, and a coolant is circulated therebetween. The cutter is rotated and plunge twisted into the workpiece to form a twisted slot therein, with adjacent ones of such slots forming twisted blanks therebetween. The individual blanks may then be subsequently machined to final shape such as an airfoil configuration.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
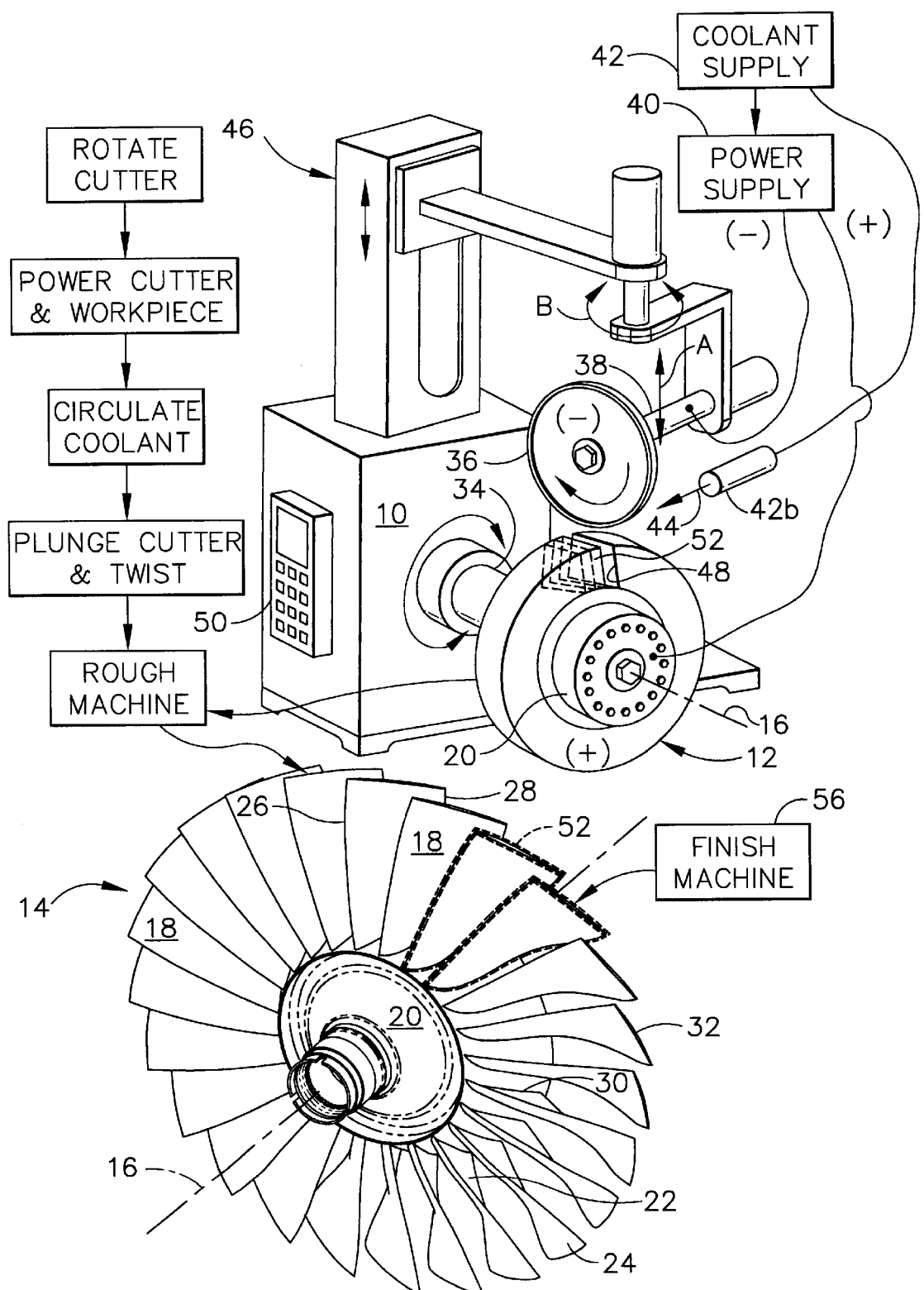
FIG. 1 is a schematic representation of an electromachining apparatus in accordance with an exemplary embodiment of the present invention for rough machining a workpiece, and a flowchart representation thereof for such rough machining followed in turn by finish machining to final shape.

Illustrated schematically in FIG. 1 is an electromachining apparatus or machine 10 configured in accordance with an exemplary embodiment of the present invention for rough machining an annular workpiece blank or disk 12 which is subsequently finish machined to form a fan or compressor blisk 14 for an aircraft gas turbine engine.

The initial workpiece 12 may be an annular forging of a suitable high-strength material for its intended use in the gas turbine engine. The workpiece is axisymmetrical about a longitudinal or axial centerline axis 16, with the resulting blisk also being axisymmetrical thereabout.

The final blisk 14 includes a row of individual airfoils 18 extending radially outwardly from a supporting rotor disk 20 in a unitary or one-piece assembly therewith. The airfoils are circumferentially spaced apart from each other around the perimeter of the disk as required for optimum aerodynamic performance and have corresponding 3D aerodynamic profiles.

More specifically, each airfoil includes a generally concave pressure side 22 and a circumferentially opposite, generally convex suction side 24 extending axially between opposite leading and trailing edges 26, 28 and radially in span from a root 30 at the perimeter of the disk to a radially outer tip 32. In the exemplary fan or compressor blisk illustrated in FIG. 1, each airfoil twists around its radial axis from root to tip thusly hiding the trailing edge of one airfoil behind the leading edge of the adjacent airfoil when viewed from the front.

In view of the substantial amount of twist of the blisk airfoils and the corresponding circumferential spacing therebetween, a substantial amount of material must be machined from the solid workpiece 12 to achieve the finally desired profiles of the airfoils.

Rapid rough machining of the initial workpiece 12 may be efficiently effected using the electromachining apparatus illustrated in FIG. 1. The machine includes a supporting shaft or mandrel 34 upon which the workpiece 12 is securely mounted coaxially therewith. An annular cutting wheel or cutter 36 is fixedly mounted on a rotary shaft or arbor 38 for rotation therewith during operation.

A suitable power supply 40, either DC constant or DC pulsed, provides means for powering or providing electrical power to the workpiece and cutter during operation. The electrical power supply includes a first negative (−) lead electrically joined to the cutter 36 in any suitable manner, such as by using a slip ring attached to an electrically conducting arbor. And a second positive (+) lead electrically joins the power supply to the workpiece in any suitable manner, such as by using another slip ring with an electrically conducting mandrel, or by direct attachment to the workpiece.

A coolant supply 42, including a discharge nozzle 42b, provides means for discharging a liquid coolant 44 at the cutting interface between the cutter and workpiece during operation. In some embodiments, it is advantageous to fully immerse the cutting zone into the coolant to provide superior heat dissipation and help ensure the entire cutting zone has coolant available. Immersion will also reduce noise and help contain and cool the removed debris. When the cutting zone is fully immersed, the machining process may be used with or without additional directed flushing of the cutting zone by the nozzle 42b.

A multiaxis carriage 46 is suitably configured for supporting the arbor and cutter and provides driving means for plunging the rotating cutter into the workpiece during operation, along with simultaneous twisting of the plunging cutter relative to the workpiece to electrically machine a twisting slot 48 at a corresponding circumferential location through the perimeter of the workpiece blank.

Since the cutter 36 is powered as a cathode (−) and the workpiece 12 is powered as an anode (+), the differential electrical potential therebetween may be used for rapidly electrically eroding material from the workpiece at the interface with the cutter being driven therein. In one embodiment referred to as Electro-Chemical Discharge Machining (ECDM), a DC voltage may be applied across the workpiece and cutter in the exemplary range of about 5–30 volts with an electrical current density in the exemplary range of about 250–900 amperes per square inch for rapidly removing material from the workpiece in forming a rough slot 48.

Considerable heat is generated by this electrical erosion, and the cutter 36 may be rotated at a suitable speed by a corresponding motor contained in the carriage for distributing the heat load around the perimeter of the cutter during operation. And, the coolant 44 may be used for flushing debris from the cutting interface and cooling the workpiece and cutter during the ECDM process. Any suitable coolant may be used such as a dilute aqueous electrolytic solution of $NaNO_3$ or sodium silicate for example for improving electrical spark performance.

A particular advantage of the plunge cutting machine 10 illustrated in FIG. 1 is the ability of the carriage to plunge radially inwardly in the direction A into the perimeter of the disk workpiece 12 the spinning cutter 36 while also twisting the cutter 36 in the rotary direction B to form the twisted slots 48 between the resulting airfoil blanks. This process is referred to herein as electrochemical discharge machining (ECDM) for its ability to rapidly remove material from the disk blank in a succession of the twisted slots for rough machining the blisk prior to subsequent final machining thereof forming the intended airfoils.

The carriage 46 may have any conventional form for pivoting or twisting the cutter 36 around the direction of plunging thereof so that as the spinning cutter slices into the perimeter of workpiece it is also twisted as required to achieve the corresponding twisting of the airfoils upon finish machining thereof.

The carriage 46 is illustrated schematically in FIG. 1 and may have any suitable configuration for both translating the cutter 36 vertically in the plunge direction A and twisting the cutter 36 in the rotary direction B relative thereto in coordinated two-axis movement. The carriage may also be configured to translate the cutter horizontally as required to form the axial extent of the twisted slots, in particular along the axially sloped root thereof.

Multiple axis machine tools are commonly available and may be modified for introducing the desired compound motion of the spinning cutter 36. Although the workpiece 12 is preferably held stationary as the spinning cutter is plunge twisted relative thereto, the workpiece itself may also be suitably moved relative to the cutter for achieving the compound plunge translation A and twisting rotation B, for example.

As shown in FIG. 1, the cutter 36 is mounted on the arbor 38 and suitably rotated during operation by a dedicated motor therefor. Correspondingly, the workpiece 12 is mounted on the mandrel 34 which is also joined to a dedicated motor for intermittent index rotation thereof And, both the carriage 46 and the mandrel motor are operatively joined to a digitally programmable controller 50 which is specifically configured in suitable software for controlling all operation of the plunge cutting machine.

This includes selective indexing of the mandrel 34 and the workpiece 12 attached thereto so that the carriage 46 may reposition the cutter 36 to plunge cut a second twisting slot 48 adjacent to the first-formed slot to leave or form a twisted airfoil blank 52 therebetween. In this way, a sequence of the twisted slots may be plunge cut in the perimeter of the workpiece leaving therebetween corresponding twisted blanks 52 from which the final airfoils are subsequently finish machined.

Figure 2:
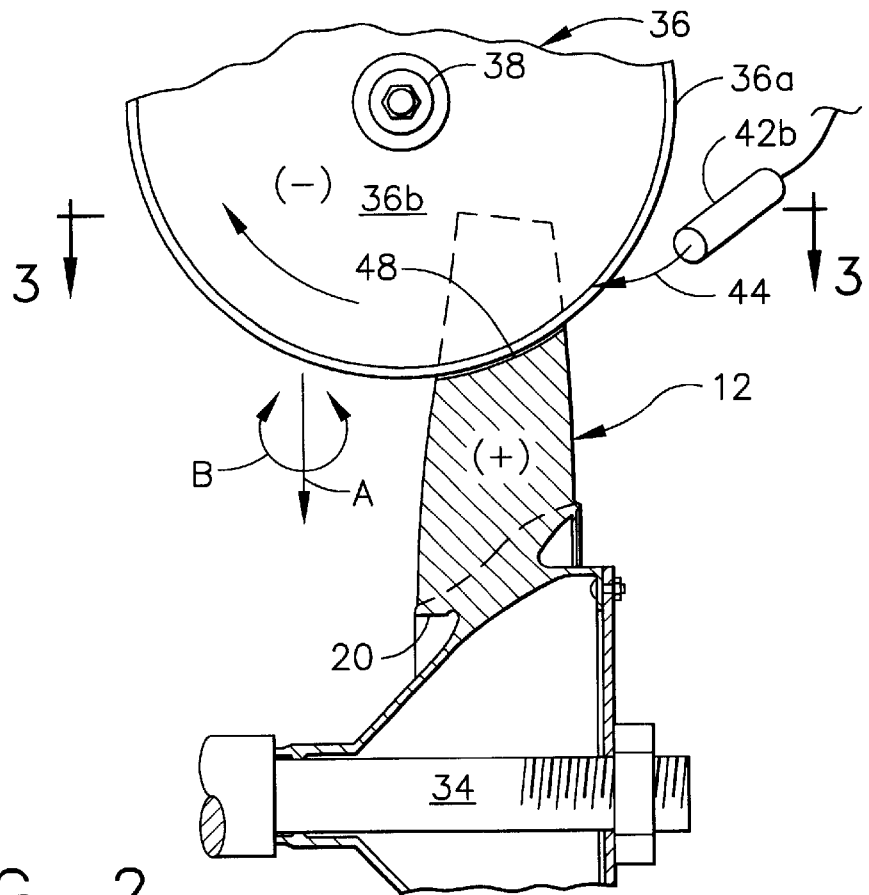
FIG. 2 is a partly sectional radial view through the workpiece and cutter illustrated in FIG. 1 during the electromachining process.
Figure 3:
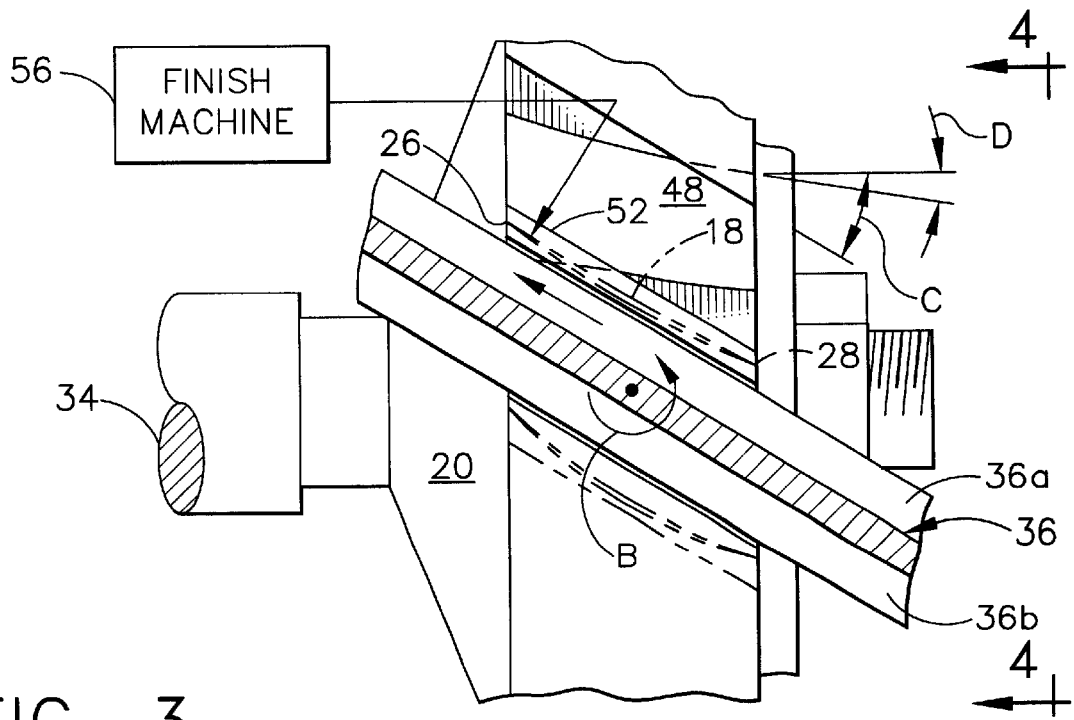
FIG. 3 is a top sectional view of the cutter and workpiece illustrated in FIG. 2 and taken generally along line 3—3.

FIGS. 1 and 2 illustrate the plunge twist cutting of one of the twisted slots 48, with FIG. 3 illustrating a top view thereof Since the airfoils 18 illustrated in FIG. 1 have substantial twist from root to tip, the machined slots 48 illustrated in FIG. 3 achieve corresponding twist by twisting the spinning cutter 36 as it plunges radially inwardly into the perimeter of the disk blank. The airfoil blank 52 formed between adjacent ones of the twisted slots 48 has corresponding twist for achieving the root-to-tip twist required for the final airfoils 18 illustrated in phantom line in FIG. 3.

FIG. 3 illustrates the twist or angular position C at the outboard end of the twisted slot 48, with less twist D at the root end of the twisted slot relative to the centerline axis of the workpiece. In this way, the airfoil blank 52 may vary in twist as required from root to tip so that the airfoil 18 finally machined therefrom has the desired root-to-tip twisting thereof.

In order to maximize material removal by the spinning cutter 36, the cutter may be made as wide as practical for one-pass cutting to minimize the need for additional passes or material removal from the airfoil blanks 52 in subsequently producing the twisted airfoils. However, the spinning cutter cannot interfere with the walls of the twisted slots as they are formed radially inwardly from the perimeter of the workpiece or undesired additional machining thereof would occur.

Accordingly, the cutter 36 initially illustrated in FIGS. 1 and 2 is in the preferred form of a disk having a perimeter rim 36a and a narrower or thinner annular web 36b. The cutter rim 36a is sized in width as large as practical to minimize the volume of the airfoil blanks 52, with the rim being substantially wider than the width of the individual twisted blanks 52.

Figure 4:
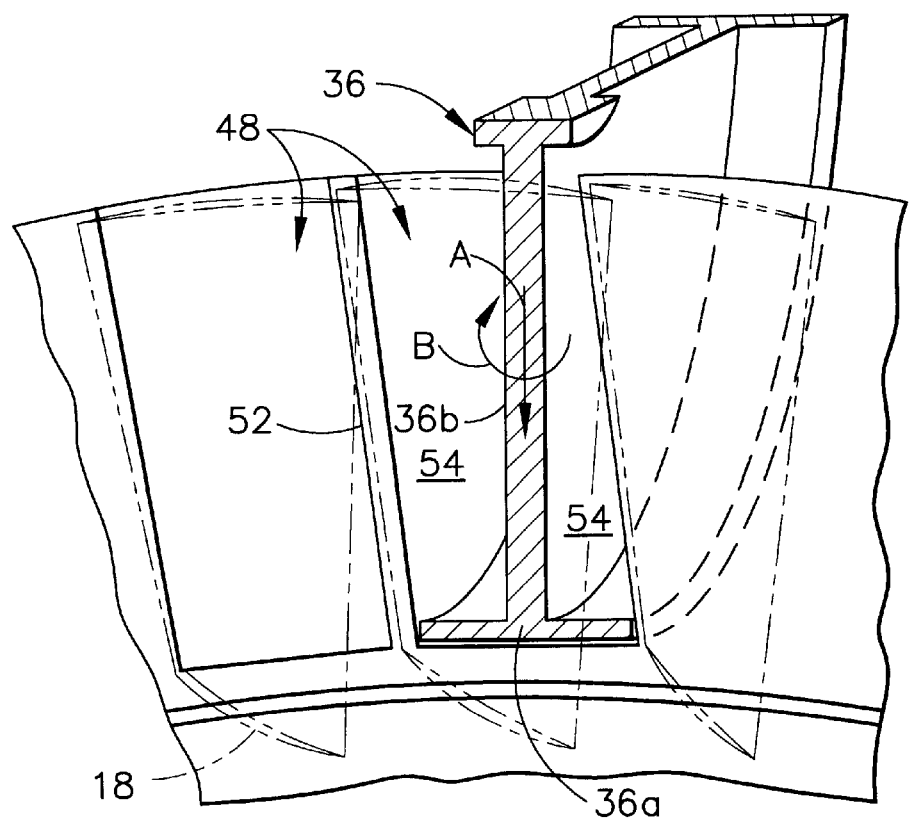
FIG. 4 is an elevational view of a portion of the workpiece and cutter illustrated in FIG. 3 and taken along line 4—4.

In the preferred embodiment illustrated in FIGS. 3 and 4, the web 36b is disposed intermediate the rim 36a generally in the middle thereof between its two opposite sides in a T-section to define corresponding recesses 54 on opposite sides of the web behind the surrounding rim. The narrow web and wider rim maximize material removal as the rim is plunge twisted into the workpiece yet provide the side recesses 54 in which twisted portions of the formed airfoil blanks 52 may be received without further machining from the cutter.

As illustrated in FIG. 4, the twisted blank 52 formed by twisting the cutter radially inwardly into the workpiece perimeter correspondingly leans at the opposite leading and trailing edges thereof over the cutter rim 36a as it is plunged radially inwardly. The right recess 54 illustrated in FIG. 4 accommodates the leaning trailing edge portion of the sidewalls of the twisted slot, while the left recess 54 accommodates the leading edge portion of the opposite sidewall of the twisted slot. After the cutter is fully driven to the root region of the airfoil blanks, it may be withdrawn from the twisted slot by reversing the plunge twist motion radially outwardly therefrom without contacting either sidewall of the twisted slot.

This preferred method of rough machining the workpiece disk 12 is illustrated in flowchart form in FIG. 1. The cutter 36 is initially rotated on its arbor 38 with the workpiece 12 being indexed at an initial position. The workpiece and cutter are electrically powered by the power supply, and the coolant 44 is circulated therebetween. The rotating cutter 36 is then plunge twisted into the perimeter of the solid workpiece to electrically erode or machine the desired twisting slot 48 therein. After a first slot is completed, the cutter is driven backwards along its entry path for removal from the twisted slot without further contacting the sidewalls thereof.

The mandrel 34 is indexed for in turn indexing the workpiece to the next position at which the spinning cutter 36 is again plunge twisted into the perimeter of the workpiece to form the second twisted slot and a corresponding one of the twisted blanks 52 therebetween. This process is repeated in sequence until the full row of twisted slots and corresponding twisted blanks 52 are formed in the perimeter of the workpiece.

The twisted blanks 52 have a generally rectangular configuration as illustrated in phantom line in FIG. 1 and in solid line in FIG. 3 and may then be finish machined in any conventional manner to achieve the final profiles and dimensions as required for the finished airfoils 18 illustrated in FIG. 1. For example, a conventional electrochemical machining apparatus 56 may be used for finish machining the rough airfoil blanks 52 to substantially their final form. An example of a suitable ECM apparatus is disclosed in U.S. Pat. No. 4,772,372, although the rough blanks 52 may be finish machined in any other conventional manner. The finally machined blanks form the corresponding airfoils 18 illustrated in FIG. 1 which twist between their leading and trailing edges 26, 28 from root 30 to tip 32 thereof.

The ability to plunge twist cut the spinning cutter 36 into the workpiece illustrated in FIG. 1 may be used to advantage in any form of electrical erosion machining. In the ECDM machining process described above, the rate of material removal from the disk may be maximized while achieving a correspondingly rough surface finish for the machined airfoil blanks 52 allowing sufficient excess material for permitting finish machining thereof to the desired smooth surface finish and aerodynamic profiles desired.

In an alternate embodiment of electrical machining, the coolant 44 may be a suitable electrolyte, with the powering means 50 being configured for electrochemically machining (ECM) the workpiece in an otherwise conventional manner using the improved plunge twisting cutting of the spinning cutter 36. In the ECDM process, relatively inexpensive cutter materials may be used, such as steel, which may readily be replaced as they become worn. Whereas in the ECM process for rough machining the blanks 52, more expensive copper or brass electrode cutter disks may be used.

For ECM operation of the plunge cutting machine illustrated in FIG. 1, DC voltages in the exemplary range of about 5–35V with capability for providing up to about 250 amps per square inch over the cutting zone surface area with an aqueous electrolyte coolant 44 such as sodium nitrate or sodium chloride solution.

It is also feasible to use the plunge twisting cutter 36 configured for electrical discharge machining (EDM) if desired.

In the various embodiments disclosed above, the spinning cutter 36 may be suitably configured for being plunge twisted into the workpiece to form the twisted slots 54 therein. This has particular utility in forming aircraft engine blisks having a row of twisted airfoils thereon. The twisted airfoil blanks corresponding to each airfoil may be rapidly formed by the plunge cutting process of the invention with a corresponding reduction in manufacturing time and cost. The airfoil blanks 52 may then be finish machined in any conventional manner to the final smoothness and profiles required for the individual airfoils.

Figure 5:
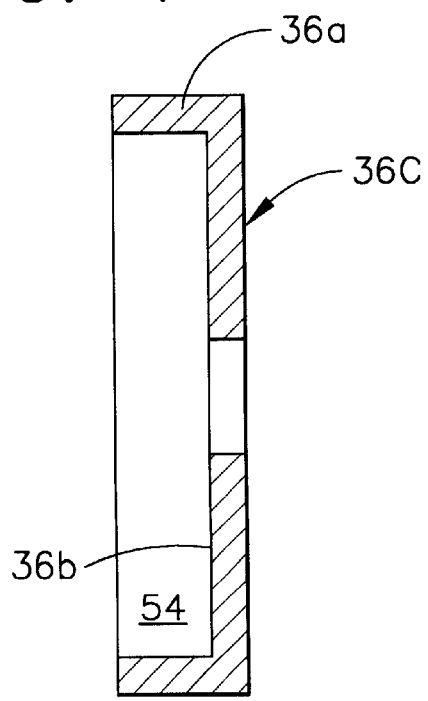
FIG. 5 is a radial sectional view of an annular cutter in accordance with another embodiment of the present invention.

FIG. 5 illustrates an alternate embodiment of the disk cutter designated 36C. In this embodiment, the web 36b is disposed along only one side of the rim 36a in a general L-section to define a single recess 54 on one said of the disk. This embodiment may be useful for certain airfoil configurations having limited twist from root to tip.

Since electromachining cutting action is preferably effected at the rim of the cutter, that rim may have any suitable configuration or profile as desired for plunge cutting the intended workpiece. The rim may be straight or arcuate in cross section, and may be smooth or interrupted as desired. The rim may have small recesses defining teeth for more rapidly removing debris material as it is eroded from the workpiece.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

What is claimed is:

1. An electromachining apparatus comprising:
    a mandrel for supporting a workpiece;
    a cutter mounted on an arbor;
    powering means for providing electrical power to said workpiece and cutter;
    cooling means for circulating a coolant between said cutter and workpiece; and
    driving means for plunging and rotating said cutter into said workpiece, and twisting said plunging cutter relative to said workpiece to electrically machine a twisting slot therein.

2. An apparatus according to claim 1 wherein said driving means are configured for twisting said cutter around the direction of plunging thereof.

3. An apparatus according to claim 2 further comprising means for indexing said mandrel and workpiece thereon, and controlling said driving means to plunge cut a second twisting slot adjacent to said first slot to form a twisted blank therebetween.

4. An apparatus according to claim 3 wherein said cutter comprises a disk having a perimeter rim and a narrower web.

5. An apparatus according to claim 4 wherein said web is disposed intermediate said rim to define recesses on opposite sides thereof.

6. An apparatus according to claim 4 wherein said web is disposed along one side of said rim to define a recess on one side thereof.

7. An apparatus according to claim 4 wherein said powering means are configured for applying a voltage across said workpiece and cutter in the range of about 5–30V with a current density in the range of about 250–900 amps per square inch for rough machining said workpiece to provide a row of said twisted slots and blanks.

8. An apparatus according to claim 4 wherein said coolant is an electrolyte, and said powering means are configured for electrochemically machining said workpiece by plunge twisting said cutter therein.

9. An apparatus according to claim 4 wherein said workpiece comprises a disk, and said driving means are configured for plunging said cutter radially inwardly into the perimeter thereof.

10. An apparatus according to claim 9 wherein said cutter rim is sized wider than said twisted blank machined therefrom.

11. An electromachining apparatus comprising:
    a mandrel for supporting a workpiece;
    a cutter mounted on an arbor for rotation therewith;
    a power supply having a first lead electrically joined to said cutter and a second lead for being electrically joined to said workpiece;
    a coolant supply having a nozzle for discharging a coolant between said cutter and workpiece; and
    a carriage supporting said arbor and cutter, and configured for plunging said rotating cutter into said workpiece and twisting said plunging cutter relative to and rotating said workpiece to electrically machine a twisting slot therein.

12. An apparatus according to claim 11 wherein said carriage is configured for twisting said cutter around the direction of plunging thereof.

13. An apparatus according to claim 12 further comprising a controller operatively joined to said mandrel and carriage for indexing said mandrel and workpiece thereon, and controlling said carriage to plunge cut a second twisting slot adjacent to said first slot to form a twisted blank therebetween.

14. An apparatus according to claim 13 wherein said cutter comprises a disk having a perimeter rim and a narrower web.

15. An apparatus according to claim 14 wherein said web is disposed intermediate said rim to define recesses on opposite sides thereof.

16. An apparatus according to claim 14 wherein said web is disposed along one side of said rim to define a recess on side thereof.

17. An apparatus according to claim 14 wherein said power supply is configured for applying a voltage across said workpiece and cutter in the range of about 5–30V with a current density in the range of about 250–900 amps per square inch for rough machining said workpiece to provide a row of said twisted slots and blanks.

18. An apparatus according to claim 14 wherein said coolant is an electrolyte, and said power supply is configured for electrochemically machining said workpiece by plunge twisting said cutter therein.

19. An apparatus according to claim 14 wherein said workpiece comprises a disk, and said carriage is configured for plunging said cutter radially inwardly into the perimeter thereof.

20. An apparatus according to claim 19 wherein said cutter rim is sized wider than said twisted blank machined therefrom.

21. An method of electromachining a workpiece comprising:
    rotating a cutter;
    electrically powering said workpiece and cutter;
    circulating a coolant therebetween; and
    plunging said rotating cutter into said workpiece and first twisting said plunging cutter relative thereto to electrically machine a twisting slot therein.

22. A method according to claim 21 further comprising twisting said cutter around the direction of plunging thereof.

23. A method according to claim 22 further comprising indexing said workpiece, and plunge cutting a second twisting slot adjacent to said first slot to form a twisted blank therebetween.

24. A method according to claim 23 wherein:
    said cutter comprises a disk having a perimeter rim and a narrower web; and
    said twisted blank leans over said rim adjacent said web as said cutter is plunge twisted into said workpiece.

25. A method according to claim 24 wherein said web is disposed intermediate said rim to define recesses on opposite sides thereof.

26. A method according to claim 24 wherein said web is disposed along one side of said rim to define a recess on one side thereof.

27. A method according to claim 24 wherein said workpiece and cutter are powered with a voltage in the range of about 5–30V with a current density in the range of about 250–900 amps per square inch for rough machining said workpiece to provide a row of said twisted slots and blanks.

28. A method according to claim 24 wherein said coolant is an electrolyte, and said workpiece and cutter are powered for electrochemically machining said workpiece by plunge twisting said cutter therein.

29. A method according to claim 24 further comprising indexing said workpiece, and plunge twist cutting in sequence a row of said twisted slots and blanks therein.

30. A method according to claim 29 further comprising electrochemically machining each of said blanks to finish form corresponding airfoils twisting between leading and trailing edges thereof.

* * * * *